United States Patent [19]

Oh et al.

[11] 3,996,260
[45] Dec. 7, 1976

[54] ALKOXYBENZYLIDENE-AMINOBENZONITRILES

[75] Inventors: Chan Soo Oh, Fullerton, Calif.;
Edward Francis Pasierb, Hamilton Square, N.J.

[73] Assignee: RCA Corporation, New York, N.Y.

[22] Filed: Sept. 8, 1975

[21] Appl. No.: 611,552

Related U.S. Application Data

[62] Division of Ser. No. 407,546, Oct. 18, 1973, Pat. No. 3,923,685, which is a division of Ser. No. 298,339, Oct. 17, 1972, Pat. No. 3,792,915.

[52] U.S. Cl. .......................... 260/465 E; 252/299; 350/160 LC
[51] Int. Cl.² ....................................... C07C 121/80
[58] Field of Search ............................. 260/465 E

[56] References Cited

UNITED STATES PATENTS

| 3,499,702 | 3/1970 | Goldmacher et al. | 260/465 X |
| 3,597,044 | 8/1971 | Castellano | 260/465 X |

*Primary Examiner*—Lewis Gotts
*Assistant Examiner*—Dolph H. Torrence
*Attorney, Agent, or Firm*—Birgit E. Morris; Glenn H. Bruestle

[57] ABSTRACT

Liquid crystal cells containing mixtures of cholesteric optically active p-alkoxybenzylidene-p'-aminobenzonitrile compounds with nematic liquid crystal compounds form cholesteric liquid crystals which change to the nematic stage upon application of an electric field. Electro-optic devices including such liquid crystals have low voltage requirements and rapid response times.

3 Claims, 3 Drawing Figures

ALKOXYBENZYLIDENE-AMINOBENZONITRILES

This is a division of application Ser. No. 407,546, filed Oct. 18, 1973, now U.S. Pat. No. 3,923,685 which in turn is a division of application Ser. No. 298,339, filed Oct. 17, 1972, now U.S. Pat. No. 3,792,915.

This invention relates to electro-optic devices which respond to application of an electric field. More particularly, this invention relates to cholesteric liquid crystal compounds which, when incorporated into an electro-optic device, change to the nematic state in the presence of an electric field.

BACKGROUND OF THE INVENTION

Certain cholesteric liquid crystal compositions are known which change to the nematic state upon application of an electric field. Wysocki et al. in Phys. Rev. Letters 20 No. 19, page 1024 (1968) reported that cholesteryl chloride, alone or in admixture with other cholesteryl derivatives including cholesteryl nanoate and cholesteryl oleyl carbonate, underwent a change from the cholesteric to the nematic state when an electric field was applied. Thus, an electro-optic cell including such materials changed from a light scattering, opaque appearance to a clear, colorless appearance when a direct current field of about $10^5$V/cm was applied. Such cells thus require a fairly high voltage and they have the further disadvantage that they have limited use temperature ranges. Thus, a similar electro-optic device which would be operative over a wider use temperature range, including room temperature, and would require lower voltage to operate than those known heretofore, would be highly desirable.

SUMMARY OF THE INVENTION

We have discovered that mixtures of certain asymmetric, optically active, p-alkoxybenzylidene-p'-aminobenzonitrile compounds with nematic liquid crystals which have a strong positive dielectric anisotropy, particularly one or more alkoxy-or acyloxybenzylidene anils, form a cholesteric liquid crystal which, on application of an electric field, forms a nematic liquid crystal. When the electric field is removed, the mixture reverts to the cholesteric phase. The electric field-induced phase changes occur very rapidly and require only low fields to operate electro-optic devices incorporating them.

DETAILED DESCRIPTION OF THE INVENTION

The asymmetric optically active p-alkoxybenzylidene-p'-aminobenzonitrile compounds useful in the present mixtures have the formula

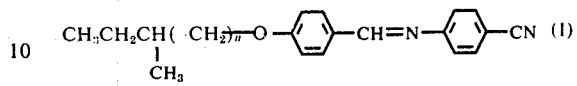

wherein n is an integer from 1 to 5. The asymmetric carbon atom can have either the R or S configuration. Mixtures of these compounds can also be employed, which generally will reduce the temperature of the transition points.

The nematic liquid crystal compounds particularly useful in the present mixtures are alkoxy- and acyloxybenzylidene anils having the formula

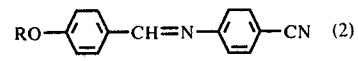

wherein R is a straight chain aliphatic radical selected from the group consisting of $C_nH_{2n+1}$-and $C_nH_{2n+1}CO$-wherein n is an integer from 1-7. These compounds and mixtures thereof are disclosed in U.S. Pat. No. 3,597,044 issued Aug. 3, 1971.

The asymmetric compounds of formula (1) can be prepared from an optically active isomer of 1-bromo-2-methylbutane by a Grignard reaction in known manner, as summarized in the following scheme I:

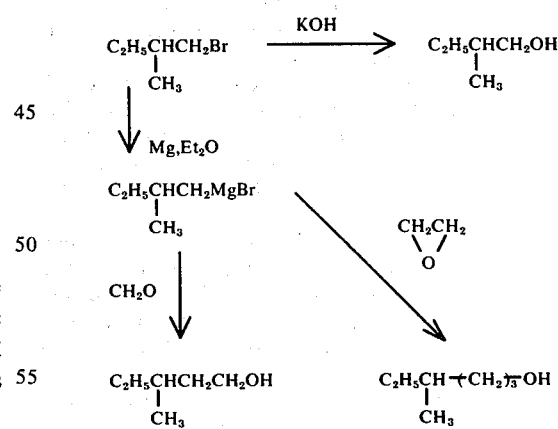

The desired alcohol is reacted with phosphorous tribromide to form the corresponding bromide; the bromide is reacted with p-hydroxybenzaldehyde in base to form the corresponding p-alkoxybenzaldehyde; and finally the p-alkoxybenzaldehyde is reacted with p-aminobenzonitrile to form the desired p-alkoxybenzylidene-p'-aminobenzonitrile. These reactions are summarized by the following scheme II:

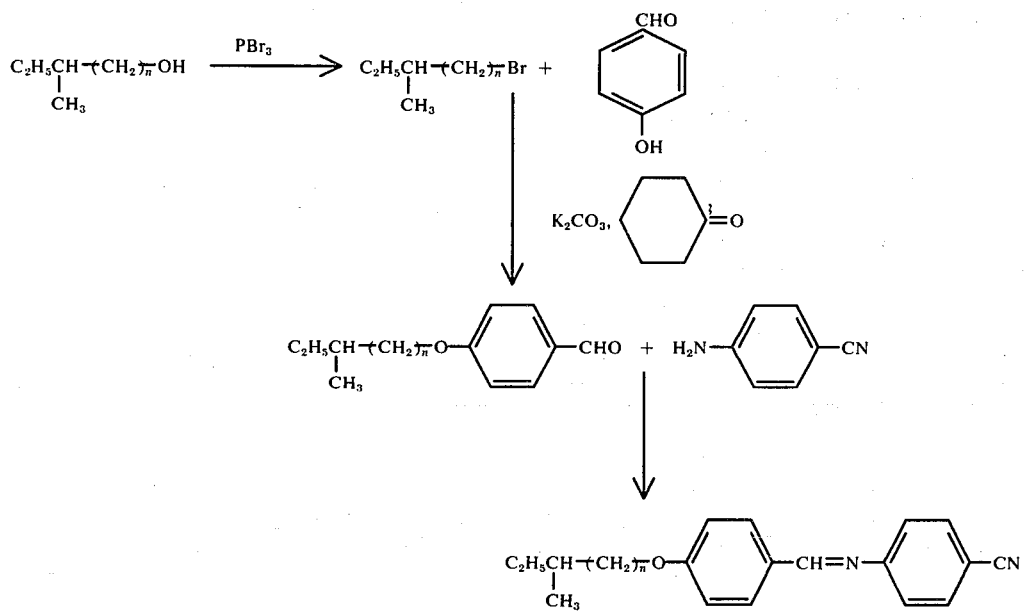

One or more asymmetric, optically active p-alkoxybenzylidene-p'-aminobenzonitrile compounds are then admixed with one or more alkoxy-or acyloxybenzylidene anil compounds to form the liquid crystal mixtures useful in the invention. The addition of one or more nematic compounds to the cholesteric compound results in a reduction of smectic thermal stability and an increase in the mesomorphic temperature range. The mixture can contain from about 5 to about 80%, preferably about 20 to about 60% by weight of the mixture of the optically active component, which in general gives the most practical use temperature range for electro-optic devices. Mixtures containing from about 40 to about 50 percent by weight of the optically active compound are particularly preferred.

Figure 1:
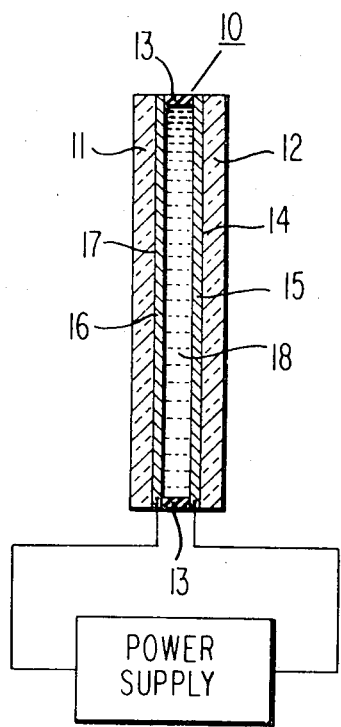
FIG. 1 is a cross-sectional view of an electro-optic device embodying the invention.

An embodiment of an electro-optic device is shown with reference to FIG. 1. The liquid crystal cell 10 consists of front and back transparent support plates 11 and 12 respectively. The support plates 11 and 12, which may be of glass, quartz, sapphire, plastic or the like, are parallel and spaced apart by a distance of about ¼–½mil by means of a polytetrafluoroethylene spacer 13. On the inner surface 14 of the back plate 12 is a transparent conductive electrode 15. On the inner surface 16 of front plate 11 is a transparent conductive electrode 17. The electrodes 15 and 17 are the means by which an electric field is applied to the device and are conventionally made of a transparent film of tin oxide, indium oxide and the like.

The space 18 between the plates 11 and 12 is filled with the liquid crystal mixture described hereinabove, which filled space is then sealed by means of an epoxy cement.

In operation, the liquid crystal cell appears opaque in the absence of an electric field. When a suitable electric field is applied thereto, the texture of the liquid crystal changes from a light scattering state to a transparent state. The response time for these changes is a function of the applied voltage, the temperature, and the concentration of the optically active compound in the liquid crystal mixture. In general, application of from about 30 — 60 volts alternating current (60 Hz) or direct current at room temperature results in a transition phase change in 100 milliseconds or less. Surprisingly, the higher the concentration of the optically active compound in the present liquid crystal mixture, the lower the voltages required to clear the cell.

When the electric field is removed, the mixture returns to the light scattering state. This time, referred to as relaxation time, also varies somewhat depending on the magnitude of the voltage applied, the temperature, and the concentration of the optically active compound in the liquid crystal mixture; in general, relaxation times vary from about 0.1 to about 0.5 second at room temperature.

Both response time and relaxation time decrease with increasing temperature. For example, a mixture which required about 300 milliseconds for response at room temperature using an electric field of 30 volts required only 40 milliseconds at 55° and 12 milliseconds at 73° C. The same mixture had a relaxation time of 200 milliseconds at room temperature and only 40 milliseconds at 73° C.

The electro-optic device as described hereinabove can be incorporated into various displays, such as electronic window shades, advertising displays, numeric indicators and the like.

The invention will be further illustrated by the following examples but it is to be understood that the invention is not meant to be limited to the details described therein. In the examples, parts and percentages are by weight unless otherwise noted.

The transition temperatures of the compositions prepared in the examples were determined using a Thomas-Hoover melting point apparatus, a differential scanning calorimeter and a polarizing hot stage microscope in conventional manner.

EXAMPLE 1

Part A - Preparation of (S) -4-methylhexanol-1

A Grignard reagent was prepared by adding 302 parts of (S)-1-bromo-2-methylbutane over 1.5 hours to 51 parts of magnesium turnings in 650 parts by volume of diethyl ether. The mixture was stirred at ambient temperatures for 1 hour and chilled to −30° C. A cold solution of 110 parts of ethylene oxide in 100 parts by volume of ether was added at a rate so as to maintain the temperature below −20° C. When the addition was complete, the mixture was allowed to come to room temperature and stirred for three hours. Part of the ether was evaporated, 300 parts by volume of benzene were added and the mixture was distilled until the temperature of distillation reached 50° C. An additional 200 parts by volume of benzene were added and distilling was continued until the distillation temperature reached 65° C. The mixture was cooled to room temperature, poured into 2500 parts of ice water and 650 parts of dilute sulfuric acid (1:3) were added. An oil layer separated out, which was collected and dried over sodium sulfate. The aqueous layer was treated with sodium chloride to obtain further oily product which was also collected.

The combined crude product mixture was distilled under vacuum. A 46% yield (100 parts) of (S)-4-methylhexonol-1 boiling at 75°–85° C/20 mm Hg was obtained.

Part B - Preparation of (S)-1-bromo-4-methylhexane (S)-4-Methylhexanol-1 (90.5 parts) prepared as above was cooled to −20° C. and 70.23 parts of phosphorous tribromide added to dropwise while maintaining the temperature below 0° C. The reaction mixture was stirred overnight at room temperature. The resultant orange-yellow solution was poured into 8000 parts of ice water and stirred. The oily layer which formed was collected, washed with cold sulfuric acid, shaken with 25 parts of potassium carbonate, filtered and distilled.

A 45% yield (62.6 parts) of (S)-1-bromo-4-methylhexane distilling at 67° C./20 mm Hg was obtained.

Part C - Preparation of (S)-p-(4-methylhexoxy)benzaldehyde

A solution of 71 parts of p-hydroxybenzaldehyde in 500 parts by volume of warm cyclohexanone was prepared and 90 parts of (S)-1-bromo-4-methylhexane and 250 parts of anhydrous potassium carbonate stirred in. The mixture was refluxed while stirring vigorously for ½ hour. The resultant dark brown mixture was filtered and the solvent removed below 70° C.

Distillation of the crude product was carried out at 120° C./0.07 mm Hg. The distillate was dissolved in ether, successively washed with 30% sodium hydroxide and water, dried and redistilled.

A 53% yield (59 parts) of colorless (S)-p-(4-methylhexoxy)benzaldehyde was collected having a boiling point of 128°–9° C./0.08 mm Hg. The specific rotation $[\alpha]_D^{25}$ was 7.40 and the density $d_4^{25}$ was 0.9866. A single spot was obtained on a thin layer chromatogram (silica gel/chloroform).

Part D - Preparation of (S)-p-(4-methylhexoxy)benzylidene-p'-aminobenzonitrile (S) -Para- (4-methylhexoxy)benzaldehyde (55 parts), 29.5 parts of p-aminobenzonitrile and 100 parts by volume of benzene were charged to a Dean-Stark trap and refluxed for 2 hours. 0.4 Part of water was collected in the trap. The resultant orange solution was distilled to remove benzene and the liquid remaining cooled to room temperature. The product was a turbid yellow liquid which turned yellow-brown on warming.

This product was dissolved in isopropanol:hexane and cooled in dry ice. The yellow crystals which separated were collected and recrystallized twice from cold isopropanol to give white crystals of (S) -p-(4-methylhexoxy)benzylidene-p'-aminobenzonitrile.

The compound prepared as above was found to have three temperatures of transition; crystal to smectic at 40° C., smectic to cholesteric at 48° C. and cholesteric to isotropic at 65.5° C.

EXAMPLE 2

The procedure in Example 1 was followed except repeating the procedure of Parts A and B to obtain (S)-1-bromo-6-methyloctane, which was then reacted following the procedure of Parts C and D.

The product, (S)-p-(6-methyloctoxy)benzylidene-p'-aminobenzonitrile, had two transition temperatures; crystal to smectic at 34° and smectic to isotropic at 77° C.

EXAMPLE 3

Preparation of (S)-3-methylpentanol-1

A Grignard reagent was prepared by reacting 26.7 parts of magnesium turnings and 150 parts of (S)-1-bromo-2-methylbutane in 300 parts by volume of diethyl ether. After refluxing for 2 hours, 50 parts of paraformaldehyde was evaporated into the above reaction mixture over several hours. The resultant slurry was poured into 1000 parts of ice water. 650 Parts of dilute sulfuric acid were then added. The oily product was collected. The aqueous layer was treated with sodium chloride to separate additional oil which was taken up in diethyl ether. The ether layer was evaporated to remove the solvent and the remaining oil added to the crude product. The combined product mixture was treated with potassium carbonate, filtered and distilled to remove the solvent and finally distilled under vacuum to give (S)-3-methylpentanol-1 as an oil.

Part B - The corresponding (S)-p(3-methylpentoxy)-benzylidene-p'-aminobenzonitrile was prepared following the procedure of Parts B, C and D of Example 1. This compound had a melting point of 63° C. By melting and supercooling, a cholesteric transition temperature of 50° C. was noted.

EXAMPLE 4

(S)-Para- (5-methylheptoxy)benzylidene-p'-aminobenzonitrile was prepared from (S) -3-methylpentanol-1 following the procedure of Example 1.

This compound had three transition temperatures; crystal to smectic at 55°, smectic to cholesteric at 59° C. and cholesteric to isotropic at 66.5° C.

EXAMPLE 5

(S) -Para- (2-methylbutoxy)benzylidene-p'-aminobenzonitrile was prepared from (S) -1-bromo-2-methylbutane following the procedure of Example 1.

This compound had a melting point of 57° C. By melting and supercooling, a cholesteric transition temperature of 39° C. was noted.

EXAMPLE 6

To a nematic mixture of equimolar amounts of p-ethoxybenzylidene-p'-aminobenzonitrile, p-n-butoxybenzylidene-p'-aminobenzonitrile and p-n-octanoylozybenzylidene-p'-aminobenzonitrile was added (S) -p-(4-methylhexoxy)benzylidene-p'- aminobenzonitrile in various amounts and the transition temperatures measured.

Figure 2:
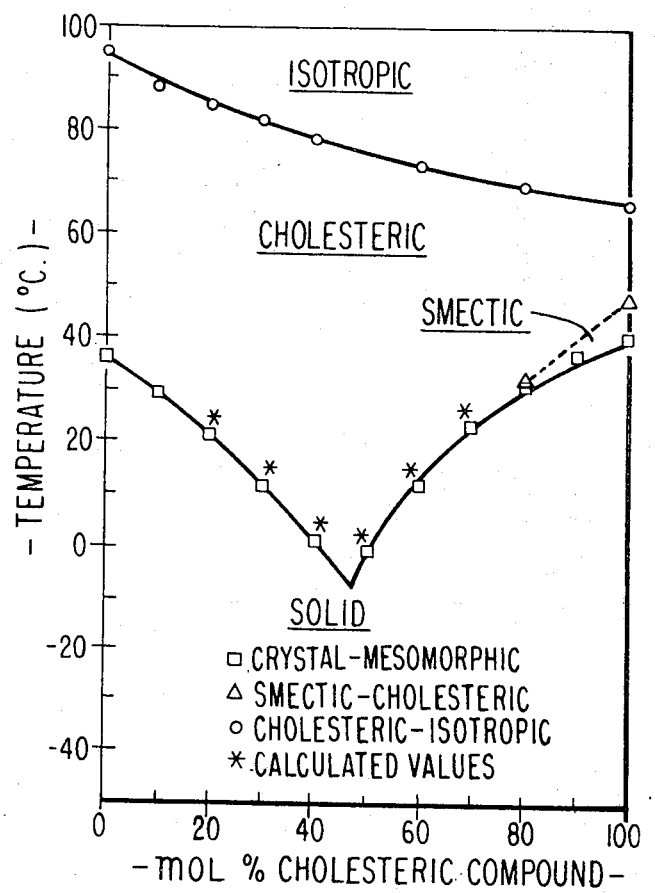
FIG. 2 is a phase diagram of the transition temperatures of mixtures described hereinafter.

The data is summarized in FIG. 2 which is a phase diagram of the mixtures wherein the ordinate varies with the temperature and the abscissa varies with the mol percent of the optically active cholesteric compound. The smectic mesomorphism gives way to cholesteric mesomorphism exclusively as increasing amounts of the nematic mixture are present. The asterisks denote calculated values for transition temperatures based on the standard cryoscopic equation $$\frac{d \ln x}{dT} = \frac{L_f}{RT^2}$$

wherein $x$ is the mol fraction of solvent (in this case the nematic mixture), $L_f$ is the heat of fusion and R is 1.9869 cal/°mol. Accordingly, a 50 mol percent mixture of the cholesteric compound in the nematic mixture will have the lowest crystal to cholesteric transition temperature.

EXAMPLE 7

Liquid crystal cells were constructed of a ½ mil thick layer of the mixtures of Example 6 between two transparent tin oxide coated glass plates which were connected to a source of alternating current operating at 60 Hz.

Figure 3:
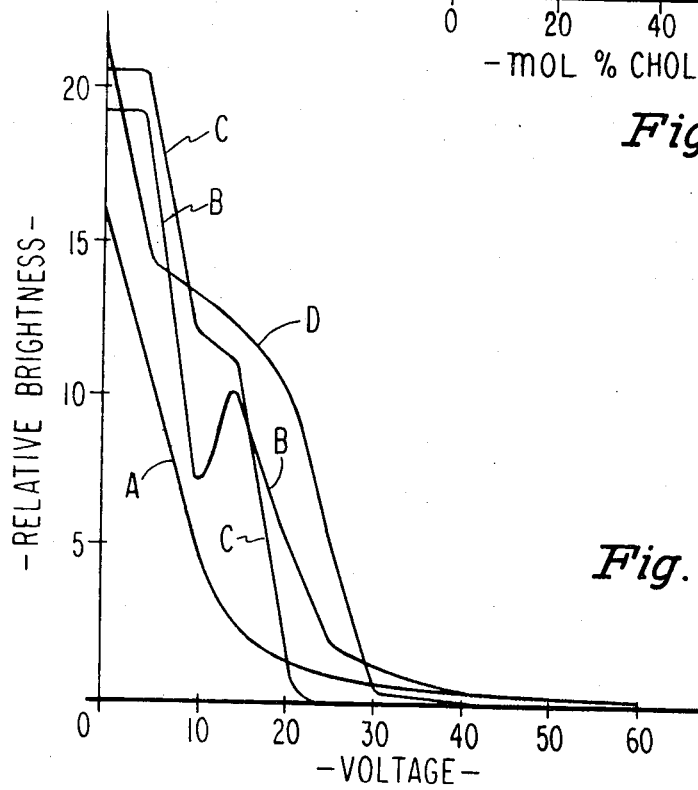
FIG. 3 is a diagram which shows the variation of voltage required to clear an electro-optic device with changing proportions of cholesteric and nematic compounds.

FIG. 3 is a diagram which shows the voltage required to clear the cell for various mixtures. An incident light beam was directed normal to the cell through a polarizer and a crossed analyzer held between a photomultiplier detector. When the cell is extinct with the crossed polarizer, the cell has been cleared. In FIG. 3 the ordinate varies with relative brightness, expressed in arbitrary units, and the abscissa varies with the voltage required to clear the cell. In the diagram, Curve A represents a mixture containing 20 mol percent of the cholesteric compound; Curve B represents a mixture containing 40 mol percent of the cholesteric compound; Curve C represents a mixture containing 60 mol percent of the cholesteric compound and Curve D represents a mixture containing 80 mol percent of the cholesteric compound.

According to the data there is an increase in brightness with increasing concentration of the cholesteric compound in the mixture in the absence of an electric field. As increasing voltage is applied, there is a sharp drop in brightness for all the mixtures. However, less voltage is required to clear the cell when the concentration of the cholesteric compound in the mixture is increased.

EXAMPLE 8

A cholesteric mixture is prepared from equimolar amounts of the products of Examples 1 and 5, admixed with the nematic mixture as in Example 6. A liquid crystal cell including this mixture turns from opaque to clear when an electric field of 50 volts is applied, which reverts to the light scattering state when the electric field is removed.

We claim:
1. An optically active compound of the formula

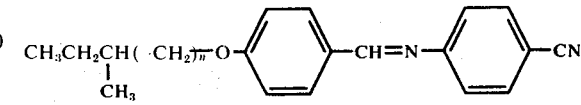

wherein $n$ is an integer of from 1–5.
2. A compound according to claim 1 wherein $n$ is 3.
3. A compound according to claim 1 wherein $n$ is 4.

* * * * *